(12) United States Patent
Calvo (10) Patent No.: US 9,464,552 B2
(45) Date of Patent: Oct. 11, 2016

(54) MIXER FOR AN EXHAUST SYSTEM (71) Applicant: Eberspächer Exhaust Technology GmbH & Co. KG, Neunkirchen (DE)

(72) Inventor: Silvia Calvo, Esslingen (DE)

(73) Assignee: Eberspächer Exhaust Technology GmbH & Co. KG, Neunkirchen (DE)

( * ) Notice: Subject to any disclaimer, the term of this patent is extended or adjusted under 35 U.S.C. 154(b) by 0 days.

(21) Appl. No.: 14/661,157

(22) Filed: Mar. 18, 2015

(65) Prior Publication Data
US 2015/0267587 A1  Sep. 24, 2015

(30) Foreign Application Priority Data

Mar. 19, 2014 (DE) .................. 10 2014 205 158

(51) Int. Cl.
| | |
|---|---|
| *F01N 3/00* | (2006.01) |
| *F01N 3/28* | (2006.01) |
| *F01N 3/20* | (2006.01) |
| *B01F 5/04* | (2006.01) |
| *B01F 5/06* | (2006.01) |
| *B01F 3/04* | (2006.01) |

(Continued)

(52) U.S. Cl.
CPC ......... *F01N 3/2892* (2013.01); *B01F 3/04049* (2013.01); *B01F 5/0473* (2013.01); *B01F 5/0616* (2013.01); *B01F 5/0617* (2013.01); *F01N 3/2066* (2013.01); *F01N 13/1872* (2013.01); *B01F 2005/0639* (2013.01); *F01N 3/103* (2013.01); *F01N 2240/20* (2013.01); *F01N 2610/02* (2013.01); *F01N 2610/1453* (2013.01); *Y02T 10/24* (2013.01)

(58) Field of Classification Search
USPC .......... 60/274, 286, 295, 297, 301, 303, 324
See application file for complete search history.

(56) References Cited

U.S. PATENT DOCUMENTS

| | | | |
|---|---|---|---|
| 2,216,846 A | 10/1940 | Lewis | |
| 7,490,467 B2 * | 2/2009 | Cummings | ............. F01N 1/088 60/274 |

(Continued)

FOREIGN PATENT DOCUMENTS

| | | |
|---|---|---|
| DE | 10 2007 012790 A1 | 9/2008 |
| DE | 10 2007 028449 A1 | 10/2008 |

(Continued)

OTHER PUBLICATIONS

Japanese Examination Report of Feb. 3, 2016 in German.

*Primary Examiner* — Binh Q Tran
(74) *Attorney, Agent, or Firm* — McGlew and Tuttle, P.C.

(57) ABSTRACT

An exhaust system mixer (12) mixes a reactant with an exhaust gas flow (3) and includes a pipe section (13), which borders a flow cross section (16), through which the exhaust gas flows (3), in the circumferential direction (17), and which extends in an axial direction (18) from a first axial side (19) to a second axial side (20), and a plurality of guide blades (14, 15), which project from the pipe section (13) at least on one of the axial sides (19, 20), so as to protrude into the flow cross section (16). Guide blades (14, 15) on an axial side, which follow each other in the circumferential direction (17), include a first guide blade group (21), arranged on the respective axial side (19, 20), axially offset in relation to the guide blades (15) of the second guide blade group (22), to reduce a pressure drop.

20 Claims, 6 Drawing Sheets

(51) Int. Cl.
*F01N 13/18* (2010.01)
*F01N 3/10* (2006.01)

(56) References Cited

U.S. PATENT DOCUMENTS

| | | | |
|---|---|---|---|
| 8,272,777 B2* | 9/2012 | Kohrs | B01F 5/0643 366/337 |
| 8,375,709 B2* | 2/2013 | Salanta | F01N 3/2066 60/317 |
| 8,615,984 B2* | 12/2013 | Kornherr | B01D 53/90 60/286 |
| 9,169,757 B2* | 10/2015 | Calvo | F01N 3/106 |
| 9,217,353 B2* | 12/2015 | Naga | F01N 3/2892 |

| | | |
|---|---|---|
| 2008/0060712 A1 | 3/2008 | Gluzman et al. |
| 2010/0083643 A1 | 4/2010 | Hayashi et al. |
| 2012/0320708 A1 | 12/2012 | Geibel |

FOREIGN PATENT DOCUMENTS

| | | |
|---|---|---|
| DE | 10 2008 029110 A1 | 12/2009 |
| DE | 10 2011 077645 A1 | 12/2012 |
| DE | 10 2012 105822 A1 | 5/2013 |
| DE | 10 2012 016423 B3 | 2/2014 |
| EP | 2 098 697 A1 | 9/2009 |
| JP | 2011-099333 A | 5/2011 |
| JP | 2013-002446 A | 1/2013 |
| JP | 2014-214742 A | 11/2014 |
| JP | 2015-055218 A | 3/2015 |

* cited by examiner

MIXER FOR AN EXHAUST SYSTEM

CROSS REFERENCE TO RELATED APPLICATIONS

This application claims the benefit of priority under 35 U.S.C. §119 of German Patent Application DE 10 2014 205 158.4 filed Mar. 19, 2014, the entire contents of which are incorporated herein by reference.

FIELD OF THE INVENTION

The present invention pertains to a mixer for an exhaust system of an internal combustion engine for mixing a reactant with an exhaust gas flow with a pipe section, which borders a flow cross section, through which the exhaust gas flow can flow, in a circumferential direction, and which extends in an axial direction from a first axial side of the pipe section to a second axial side of the pipe section and with a plurality of guide blades, which project from the pipe section at least on one of the axial sides such that they protrude into the flow cross section. The present invention pertains, moreover, to a reactant feeding device for an exhaust system of an internal combustion engine, which is equipped with such a mixer. Finally, the present invention pertains to an exhaust system for an internal combustion engine, which is equipped with such a reactant feeding device.

BACKGROUND OF THE INVENTION

A mixer for an exhaust system of an internal combustion engine, which is used to mix and evaporate a reducing agent with an exhaust gas flow, is known from DE 10 2007 028 449 A1. The mixer has for this purpose a pipe section, which borders a flow cross section, through which the exhaust gas flow can flow, in a circumferential direction, and which extends in an axial direction from a first or incoming flow-side axial side of the pipe section to a second or discharge-side axial side of the pipe section. Furthermore, the pipe section comprises a plurality of guide blades, which project from the pipe section on one of the axial sides, doing so such that they protrude into the flow cross section. The guide blades project essentially radially from the pipe section in the prior-art mixer. Further, all guide blades are arranged on the same axial side of the pipe section in the prior-art mixer. Furthermore, all guide blades are set with the same pitch angle in relation to the axial direction in the prior-art mixer. As a result, the exhaust gas flow is affected in case of a twist concentrically to the central longitudinal axis of the mixer during its flow through the mixer.

It is often necessary in exhaust systems of internal combustion engines to introduce a reactant, i.e., preferably an oxidizing agent or a reducing agent, into the exhaust gas flow. For example, a fuel may be introduced as an oxidizing agent upstream of an oxidation catalytic converter in order to increase the heat in the exhaust gas flow by a catalytic reaction of the fuel in the oxidation catalytic converter. For example, a particle filter can be heated in this manner to a regeneration temperature. Further, it is known in connection with so-called SCR systems that an aqueous urea solution may be introduced as a reducing agent into the exhaust gas flow upstream of an SCR catalytic converter in order to bring about a reduction of nitrogen oxides in the SCR catalytic converter. SCR denotes Selective Catalytic Reduction. The mixing of the reactant introduced with the exhaust gas flow can be improved by means of such a mixer. In addition, the mixer may act as an evaporator and prevent liquid reactant from reaching the respective catalytic converter in case of liquid reactants.

SUMMARY OF THE INVENTION

It is an object of the present invention to provide an improved embodiment, which is characterized especially by a reduced flow resistance and/or by improved mixing between the reactant and the exhaust gas flow, for a mixer of the type described in the introduction or for a reactant feeding device equipped therewith or for an exhaust system equipped therewith.

The present invention is based on the general idea of dividing the guide blades into at least two groups of guide blades, wherein the at least two guide blade groups are adjacent to one another in the circumferential direction or are offset at least in relation to one another in the circumferential direction, so that each guide blade group extends in the circumferential direction only over part of the circumference of the pipe section. Furthermore, it is proposed according to the present invention that the guide blades of one guide blade group or of the first guide blade group be arranged offset in the axial direction in relation to the guide blades of the other or second guide blade group. This means that the guide blades of the first guide blade group either project over the guide blades of the second guide blade group or lag behind these in the axial direction. The latter case happens when the guide blades of the second guide blade group project over the guide blades of the first guide blade group in the axial direction. The guide blades of the first guide blade group now cover a first cross-sectional area of the flow cross section of the pipe section, through which cross section flow is possible, while the guide blades of the second guide blade group cover a second cross-sectional area of the flow cross section. The consequence of the mode of construction according to the present invention is that the exhaust gas flow first reaches the guide blade group located upstream during the operation of the mixer or of the exhaust system and it reaches the guide blade group located downstream only thereafter. Thus, the pressure increases in at least two steps during the flow through the mixer. However, the pressure rise that becomes established altogether remains lower than the pressure rise that becomes established when all guide blades are arranged in the same axial section and the exhaust gas flow correspondingly arrives at them simultaneously. This reduced pressure rise is explained by the fact that when reaching the guide blade group located upstream, the exhaust gas flow can partially escape into the other cross-sectional area, which is associated with the guide blade group located downstream. If the exhaust gas flow subsequently reaches the guide blade group located downstream, it can again escape partially into the cross-sectional area that is associated with the guide blade group located upstream. Thus, only a partial cross-sectional area rather than the entire flow cross section is blocked by the guide blades in this axially offset arrangement of the guide blades, so that the exhaust gas flow can escape in each case and pass through the mixer with reduced flow resistance.

An embodiment in which the corresponding guide blades are divided on one of the axial sides into at least two guide blade groups arranged axially offset in relation to one another is preferred. The stepped flow past the guide blade groups thus takes place at the inlet of the mixer (incoming flow-side axial side or incoming flow side of the mixer) or at the outlet of the mixer (discharge-side axial side or discharge side of the mixer). Conceivable is an embodiment in which the axially offset guide blade groups are provided on the incoming flow side only or on the discharge side only. Either no guide blades are provided on the respective other axial side here, or guide blades arranged conventionally in a common axial section are provided. Also conceivable is an embodiment in which axially offset guide blade groups are present on both the incoming flow side and the discharge side.

Provisions may be made in an alternative embodiment for the guide blades of the first guide blade group to be arranged on one axial side, e.g., on the discharge side, while the guide blades of the second guide blade group are arranged on the other axial side, e.g., on the incoming flow side.

At least some of the guide blades may advantageously have a pitch angle in relation to the axial direction, as a result of which the mixing of the flow is improved.

According to an advantageous embodiment, the pitch angles of the guide blades of the first guide blade group may have different pitch angles than the guide blades of the second guide blade group. The flow through the mixer can be influenced hereby. Greatly differing pitch angles are only possible due to the axial offset of the guide blade groups, because a collision of adjacent guide blades may occur within the same axial section if these guide blades have greatly different pitch angles.

Corresponding to an especially advantageous embodiment, the pitch angles of the guide blades of the first guide blade group may be oriented opposite the pitch angles of the guide blades of the second guide blade group. The axially offset arrangement of the two guide blade groups makes it possible to impart a different orientation to the guide blades of one guide blade group in terms of their pitch angle compared to the guide blades of the other guide blade group. For example, it is possible as a result to impose a first twist, for example, a right twist, on the exhaust gas flow in a first twist direction by means of the guide blades of the first guide blade group. A second twist, for example, a left twist, can then be imposed on the exhaust gas flow in a second twist direction opposite the first twist direction with the guide blades of the second guide blade group. It is achieved hereby, on the whole, that a first vortex suction develops in the cross-sectional area associated with the first guide blade group, while a second vortex suction, which is parallel to the first vortex suction but rotates in the opposite direction, develops in the cross-sectional area associated with the second guide blade group. This leads to intensive mixing.

According to another embodiment, the pipe section and the guide blades may be formed by a single shaped sheet metal part. In other words, the pipe section together with the guide blades is manufactured by shaping from a single sheet metal body. As a result, the mixer can be manufactured at an especially low cost. On the whole, it becomes unnecessary to attach the guide blades to the pipe section. The pipe section or the mixer may have, in principle, any desired flow cross section, into which the guide blades protrude. In particular, any desired polygonal cross sections are conceivable, in which corners of such a polygonal cross section may be advantageously rounded. However, a round cross section, especially a circular cross section or an elliptical or oval cross section is preferred.

According to another embodiment, at least one guide blade may have a different pitch angle relative to the axial direction at least within one of the guide blade groups than at least one other guide blade of the same guide blade group. By varying the pitch angle in one or more guide blades, it is possible to further affect and optimize the mixing in the mixer. In particular, it may be advantageous to vary the pitch angle in the area of a transition between one guide blade group and the other guide blade group in order to improve the twisting during the flow and hence the mixing.

In another embodiment, at least one of the guide blades of one guide blade group may have a different blade length than at least one guide blade of the other guide blade group, the blade length always being measured from a blade foot arranged at the pipe cross section to a blade tip located at a distance from the pipe section. By increasing the length of individual guide blades, it is possible to also cover a central area of the mixer with blade surface in order to make the mixer extensively opaque in the central area of the flow cross section.

In addition or as an alternative, at least one guide blade may have a different blade length than at least one other guide blade of that guide blade group at least within one of the guide blade groups. The blade length is measured from a blade foot arranged at the pipe cross section to a blade tip located at a distance from the pipe section in this case as well. This measure can also be used to improve the coverage of the flow cross section with blade surface.

Corresponding to an advantageous variant, provisions may be made for at least one of the longer guide blades to extend beyond a central longitudinal axis. As a result, the area of the central longitudinal axis is also covered by the corresponding longer guide blade in the axial direction or in the main direction of flow, so that the risk of drops passing through is reduced in his central cross-sectional area as well.

According to a preferred embodiment, the first guide blade group and the second guide blade group may extend in the circumferential direction each over an angle range between and including 30° up to and including 330°, preferably over an angle range between including 60° up to and including 300°, especially over an angle range between and including 90° up to and including 270°, or each over about half the circumference of the pipe section. If the guide blades are arranged on the same axial side of the pipe section, the sum of the individual circumferential sections associated with the guide blade group equals up to 360°. If, by contrast, the guide blade groups are arranged on different axial sections of the pipe section, the sum of the individual circumferential sections associated with the guide blade groups may also equal more than 360°. If a total of more than 360° is covered by guide blades in this manner, there is mutual overlap of the axially offset guide blade groups in the axial direction.

In case the two guide blade groups extend over about half the circumference of the pipe section, exactly two guide blade groups are provided. They extend over 180° each. It is conceivable in another embodiment that only two guide blade groups are again provided, and one guide blade group extends over more than 180° in the circumferential direction, while the other guide blade group will extend over a correspondingly smaller percentage of the circumference. According to another embodiment, it is conceivable that the guide blades are divided as a whole into three or more guide blade groups. In case of three guide blade groups, the guide blades of the third guide blade group are arranged axially between the guide blades of the first guide blade group and the second guide blade group.

In another embodiment, the first guide blade group and the second guide blade group may contain each an equal number of guide blades. As a result, the mixer will have a comparatively symmetrical design in respect to the flow taking place through it. As an alternative, an embodiment is also conceivable in which the guide blade groups have different numbers of guide blades.

Provisions may be made in another embodiment for the guide blades of the first guide blade group to have a different blade width than the guide blades of the second guide blade group. The respective blade width is measured at right angles to the blade length here and extends from one leading edge of the respective guide blade to a discharge edge of the respective guide blade. By using different blade widths, it is possible to affect the impact surface, on the one hand, and the flow guiding and hence the mixing and the flow resistance, on the other hand.

Provisions may be made according to another advantageous embodiment for at least one of the guide blades within at least one of the guide blade groups to be arranged axially offset in relation to at least one other guide blade of the same guide blade group. An axially stepped incoming flow of the exhaust gas flow can be achieved in this manner to the individual guide blades in this manner already within the corresponding guide blade group. The corresponding guide blade group may comprise only a single guide blade in the extreme case. However, embodiments in which the respective guide blade group contains a plurality of guide blades is preferred.

According to an especially advantageous embodiment, all guide blades may be arranged in a contactless manner relative to one another. The risk of undesired noise generation is reduced in case of such a mode of construction.

A pipe arrangement for guiding an exhaust gas flow, in which an injector is provided on this pipe arrangement for generating a spray jet of reactant to introduce the reactant into the gas flow, is provided in a reactant feeding device according to the present invention. A mixer of the above-mentioned type is then arranged downstream of this injector in the pipe arrangement relative to this gas flow.

According to an advantageous variant, the injector may be arranged laterally at the pipe arrangement. The mixer is arranged now in the pipe section such that the first guide blade group and the second guide blade group are located on an incoming flow side of the mixer and the first guide blade group faces the injector, while the second guide blade group faces away from the injector. Further, the guide blades of the first guide blade group are arranged axially offset in relation to the guide blades of the second guide blade group in the direction of a discharge side of the mixer. The consequence of this is that with the injector arranged laterally, the spray jet can reach the guide blades better. It was found that the risk of drops passing through the mixer is reduced hereby.

According to another advantageous embodiment, the injector may generate a spray jet sloped in relation to the axial direction of the mixer. The attachment of the injector to the pipe arrangement becomes simpler in case of lateral arrangement and sloped spray jet. At the same time, a special flow dynamics develops as a result within the exhaust gas flow, and this flow dynamics can be taken into account by means of the mixer being presented here in order to avoid, for example, the passing of drops through the mixer. Further, the evaporation of the reactant, which reaches the guide blades in the liquid form, is improved.

Especially compact is an embodiment in which the pipe arrangement has, upstream of the mixer in relation to the exhaust gas flow, a bottom, which generates a wake in the exhaust gas flow. The mixer is advantageously arranged in this case such that the first guide blade group and the second guide blade group are located on an incoming flow side of the mixer and the guide blades of the second guide blade group protrude axially into the wake. Reduced flow velocities prevail in such a wake, and these reduced velocities may cause the spray jet to reach a pipe wall defining the cross section of the pipe arrangement, through which cross section flow is possible. This pipe wall is comparatively cool, which counteracts rapid evaporation. Due to the guide blades of the second guide blade group being positioned in this wake, the spray jet reaches at best the guide blades of the second guide blade group. The mixer has a higher temperature than said pipe wall, as a result of which the evaporation of the reactant is supported.

An SCR catalytic converter is provided in an exhaust system according to the present invention. Further, a reactant feeding device of the above-mentioned type is arranged upstream of the SCR catalytic converter. An aqueous urea solution is advantageously used here as the reactant or as a reducing agent. This solution is converted into ammonia and carbon dioxide by thermolysis and hydrolysis. A reduction of nitrogen oxides to nitrogen and water can then take place in the SCR catalytic converter.

Advantageous is an embodiment in which an oxidation catalytic converter, e.g., a diesel oxidation catalytic converter, is arranged upstream of the injector. The oxidation catalytic converter can convert fuel residues of the exhaust gas flow in the known manner. In addition or as an alternative, a particle filter, e.g., a diesel particle filter, may be arranged downstream of the mixer. Particles, especially soot particles, can be filtered out of the exhaust gas flow by means of a particle filter.

Such a particle filter may be, in principle, a separate particle filter, which is present in addition to the SCR catalytic converter. The particle filter is advantageously arranged downstream of the SCR catalytic converter here. Corresponding to an especially advantageous embodiment, the SCR catalytic converter may be designed in the form of an SCR catalytic converter coating, in which case a particle filter is provided, which is equipped with this SCR catalytic converter. The function of the SCR catalytic converter is integrated in this manner in the particle filter. Such particle filters with SCR catalytic converter coating are known, for example, from DE 10 2012 105 822 A1.

It is apparent that the above-mentioned features, which will also be explained below, may be used not only in the particular combination indicated, but in other combinations or alone as well, without going beyond the scope of the present invention.

Preferred exemplary embodiments of the present invention are shown in the drawings and will be explained in more detail in the following description, in which identical reference numbers designate identical or similar or functionally identical components. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Referring to the drawings, corresponding to FIGS. 1 through 7, an exhaust system 1, which is shown only partially here and which is used to remove combustion waste gases in an internal combustion engine, comprises an exhaust line 2 for guiding an exhaust gas flow 3 indicated by arrows. An SCR catalytic converter 4 is arranged in the exhaust line 2. A reactant feeding device 5 is arranged in the exhaust line 2 upstream of the SCR catalytic converter 4. A reactant, for example, in the form of a spray jet 6, can be fed into the exhaust gas flow 3 by means of the reactant feeding device 5. A reducing agent is used as the reactant in connection with such an SCR catalytic converter 4. Nitrogen oxides can be reduced by means of the reducing agent in the SCR catalytic converter. In the example, the exhaust line 2 comprises, upstream of the reactant feeding device 5, an oxidation catalytic converter 7, which is preferably a diesel oxidation catalytic converter. Downstream of the reactant feeding device 5, the exhaust line 2 may contain a particle filter 8, which is especially a diesel particle filter. The particle filter 8 may be arranged, in principle, downstream of the SCR catalytic converter 4. The SCR catalytic converter 4 and the particle filter 8 form separate components in this case. However, FIGS. 1 through 7 show a preferred embodiment, in which the SCR catalytic converter 4 is formed by an SCR catalytic converter coating, with which the particle filter 8 is provided. The particle filter 8 has, for example, a ceramic filter body, which has a plurality of inlet ducts, which are closed on the outlet side, and a plurality of outlet ducts, which are closed on the inlet side, wherein partitions, which separate the inlet ducts from the outlet ducts, are permeable to the exhaust gas flow 3, whereas they are essentially impermeable to the particles being entrained. The inlet ducts and/or the outlet ducts may be provided with said SCR catalytic converter coating 9, as a result of which the function of the SCR catalytic converter 4 is integrated in the particle filter 8.

Corresponding to FIGS. 1 through 7, the reactant feeding device 5 comprises a pipe arrangement 10, which is integrated into the exhaust line 2 and which is correspondingly likewise used to guide the exhaust gas flow 3. Further, the reactant feeding device 5 comprises an injector 11 for generating a spray jet 6 from reactant in order to introduce the reactant into the gas flow 3. The injector 11 is arranged for this on the pipe arrangement 10. The reactant feeding device 5 comprises, moreover, a mixer 12, which is arranged downstream of the injector 11 in the pipe arrangement 10 in relation to the exhaust gas flow 3. The mixer 12 is a separate component in relation to the pipe arrangement 10. It is inserted into the pipe arrangement 10 and is fastened to it in a suitable manner.

Preferred embodiments of the mixer 12 will be described in more detail below on the basis of FIGS. 8 through 12. The mixer 12 comprises a pipe section 13 and a plurality of guide blades 14, 15. The pipe section 13 borders a flow cross section 16, through which flow is possible, in a circumferential direction 17. Further, the pipe section 13 extends in an axial direction 18, which extends in parallel to a central longitudinal axis 24 of the pipe section 13 and of the mixer 12, from a first axial side 19 to a second axial side 20. The guide blades 14, 15 are arranged at least on one of the axial sides 19, 20. All guide blades 14, 15 are arranged on the first axial side 19 in the example according to FIGS. 8 through 11. The guide blades 14, 15 are distributed, by contrast, on both axial sides 19, 20 in the example according to FIG. 12. The guide blades 14, 15 project from the pipe section 13 on the respective axial side 19 and 20 such that they protrude into the flow cross section 16. The individual guide blades 14 extend essentially radially here. It is clear that the direction in which the guide blades 14, 15 extend may also have, in principle, an axial component. However, the radial component is, as a rule, greater than the axial component.

According to FIGS. 8 through 12, the guide blades 14, 15 are divided in the circumferential direction 17 into a first guide blade group 21 and a second guide blade group 22. The guide blades designated by 14 are associated with the first guide blade group 21, while the guide blades designated by 15 are associated with the second guide blade group 22. The two guide blade groups 21, 22 follow each other in the circumferential direction 17 in these examples, so that they do not essentially overlap each other in the axial direction. The guide blades 14 of the first guide blade group 21 are consequently arranged offset axially, i.e., in the axial direction 18, in relation to the guide blades 15 of the second guide blade group 22 on the first axial side 19 in the mixer 12 shown in FIGS. 8 through 11. The first axial side 19 is preferably the axial side to which the flow arrives, i.e., the incoming flow side of the mixer 12. The exhaust gas flow 3 is indicated for this case by a corresponding flow direction arrow in FIG. 19. The guide blades 14 of the first guide blade group 21 are correspondingly set back or offset in the downstream direction in relation to the direction of flow of the exhaust gas flow 3 against the guide blades 15 of the second guide blade group 22.

Figure 12:
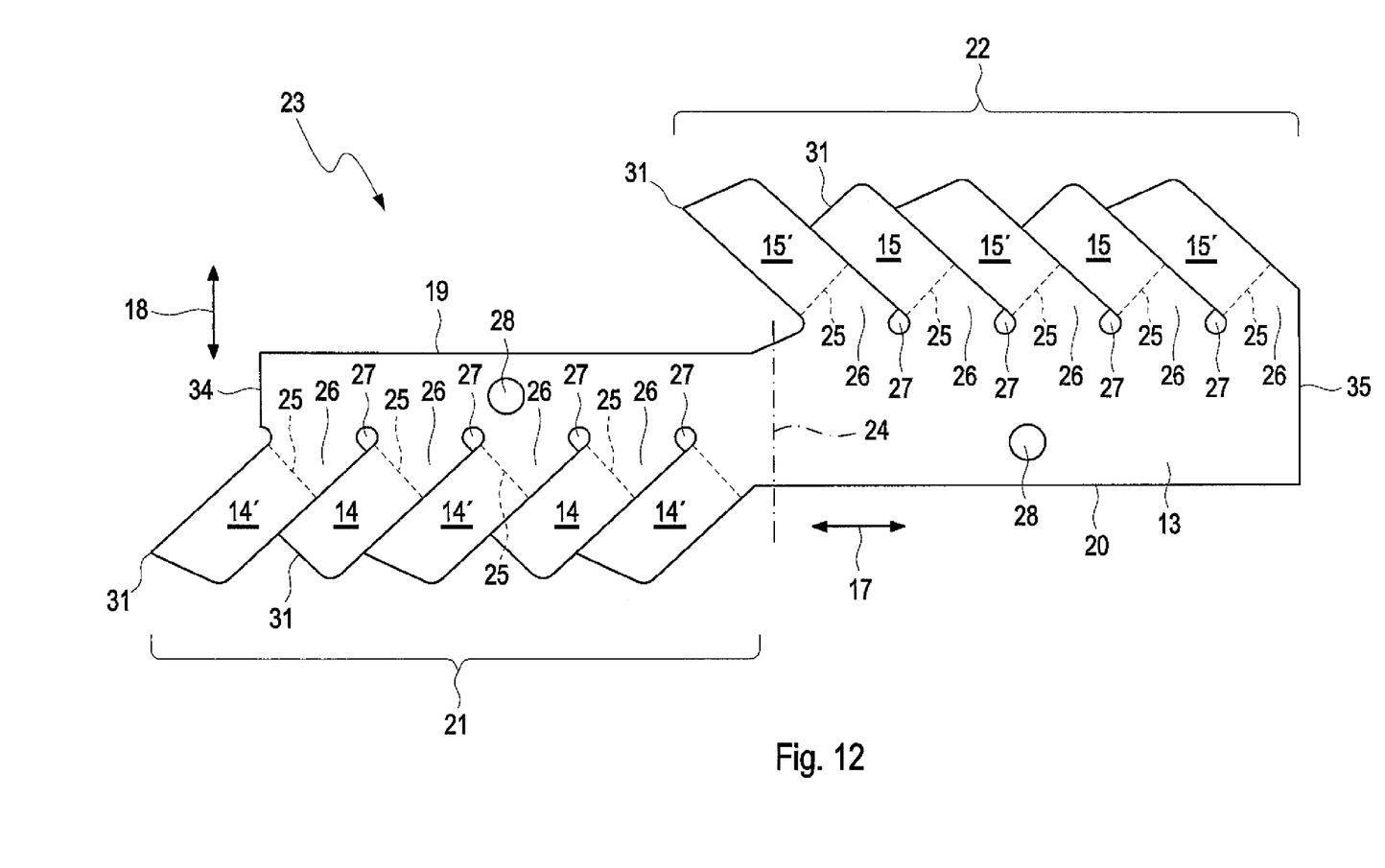
FIG. 12 is a layout as shown in FIG. 11, but in another embodiment of the mixer.

Contrary to this, FIG. 12 shows an embodiment in which the two guide blade groups 21, 22 are arranged or formed on different axial sides 19, 20 of the pipe body 13. The first guide blades 14 of the first guide blade group 21 are consequently formed in FIG. 12 on the discharge side, which corresponds to the second axial side 20, while the second guide blades 15 of the second guide blade group 22 are formed on the incoming flow side, which corresponds to the first axial side 19.

Figure 9:
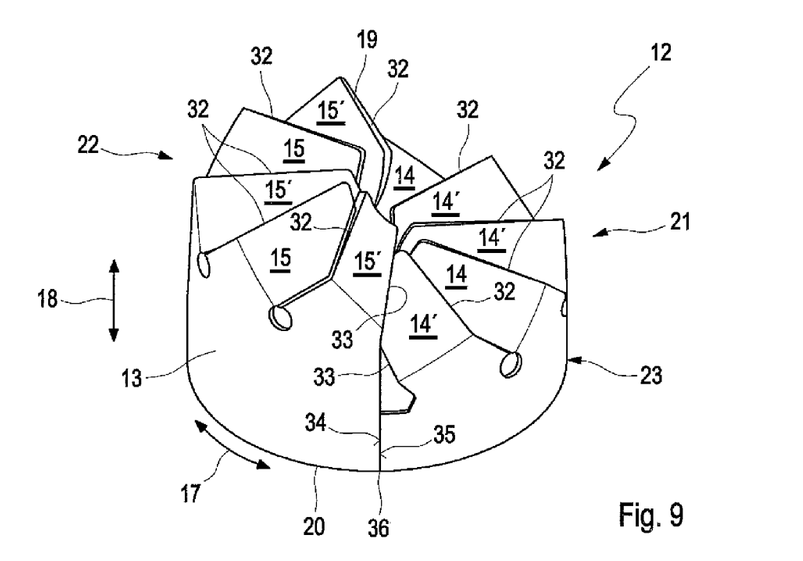
FIG. 9 is an isometric view of the mixer.
Figure 10:
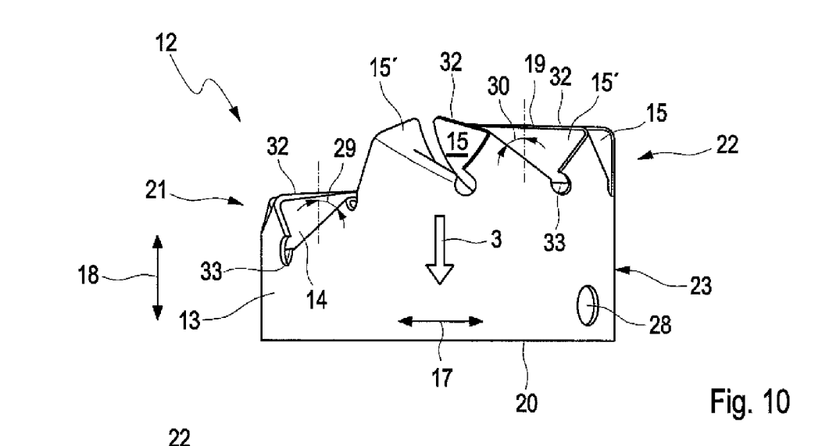
FIG. 10 is a side view of the mixer.
Figure 11:
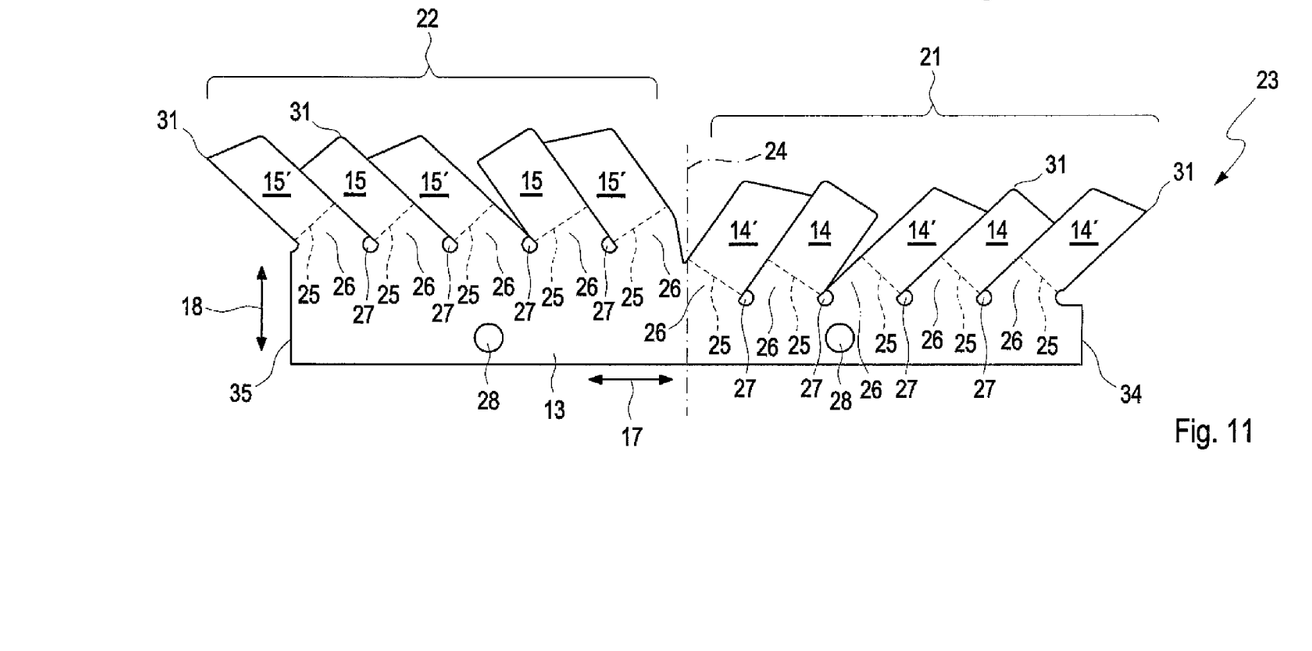
FIG. 11 is a view of a layout of a sheet metal body, from which the mixer can be manufactured.

The mixer 12 according to FIGS. 8 through 12 is preferably designed as a shaped sheet metal part 23. This means that the pipe section 13 with all guide blades 14, 15 is manufactured by shaping from a single sheet metal body, which will then form the shaped sheet metal part 23 after shaping. FIGS. 11 and 12 show the layout of the shaped sheet metal part 23. The layout represents here the state of the shaped sheet metal part 23 prior to the shaping. The shaped sheet metal part 23 is flat in FIGS. 11 and 12. The pipe section 13 and the individual guide blades 14, 15 are already present. To manufacture the mixer 12, the shaped sheet metal part 23 must only be bent about the central longitudinal axis 24 of the mixer 12 or of the pipe section 13 in the circumferential direction 17. In addition, the blades 14 must each be bent about a bending edge 25. Undercuts 27, which reduce the notch effect, can be recognized in the area of the blade feet 26. Further, two openings 28, which can be used, for example, to fix the mixer 12 in the pipe arrangement 10, can be recognized in the pipe section 13. In addition, or as an alternative, these openings 28 may also be used during the manufacture and/or during the handling of the mixer 12.

The shaped sheet metal bodies 23 are bent circularly in the examples according to FIGS. 8 through 12, as a result of which the flow cross section 16 is circular. Further, two longitudinal ends 34, 35 of the shaped sheet metal part 23 according to FIG. 9 are shaped so as to form a butt joint, so that they meet each other in a butt joint 36 in the circumferential direction 17. This butt joint 36 can also be recognized in FIG. 8. Other round cross sections or even nonround cross sections are likewise conceivable.

The guide blades 14, 15 are set to a pitch angle in relation to the axial direction 18 in the embodiments shown in FIGS. 8 through 12, so that they have a pitch angle 29 and 30, respectively. The respective pitch angle 29, 30 of the respective guide blade 14, 15 may vary along the longitudinal direction of the respective guide blade 14, 15. The guide blades 14 of the first guide blade group 21 have first pitch angles 29 here, while the guide blades 15 of the second guide blade group 22 have second pitch angles 30. The pitch angle 29, 30 is defined here as the angle that a chord of the respective guide blade 14, 15 has in relation to the axial direction 18. The chord of the respective guide blade 14, 15 is a straight line, which connects an incoming flow edge with a discharge edge of the respective guide blade 14, 15. The cross-sectional profile is measured at right angles to a blade length. According to FIGS. 11 and 12, the blade length extends within the respective guide blade 14, 15 from a blade foot 26 to a blade tip 31. In case the guide blades 14, 15 are arranged on the incoming flow side of the pipe section 13 or of the mixer 12, some of the incoming flow edges are designated by 32 and some of the discharge edges by 33 in FIGS. 9 and 10.

It can be seen especially in FIGS. 9 through 11 that the pitch angles 29 of the guide blades 14 of the first guide blade group 21 are oriented opposite the pitch angles 30 of the guide blades 15 of the second guide blade group 22. According to FIG. 10, the guide blades 14 of the first guide blade group 21 are pitched "to the right," while the guide blades 15 of the second guide blade group 22 are pitched "to the left." The pitch angles 29 of the corresponding guide blades 14, which can hereinafter also be called first guide blades 14, have the same orientation within the first guide blade group 14. The pitch angles 30 of the corresponding guide blades 15, which can hereinafter also be called second guide blades 15, have the same orientation within the second guide blade group 22. The first guide blades 14 of the first guide blade group 21 thus generate a twist oriented in a first direction of rotation, while the second guide blades 15 of the second guide blade group 22 generate a twist oriented in an opposite, second direction of rotation during the flow taking place through them. This results in an especially intensive mixing during the flow through the mixer 12.

As can be seen especially in FIG. 11, the two left-hand guide blades 14 in the first guide blade group 21 have an orientation in relation to the axial direction 18 that is different from that of the three right-hand guide blades 14. When bending about the respective bending edge 25, different pitch angles 29 are formed as a result in the first guide blades 14 of the first guide blade group 21. The pitch angles 29 now have different values, but they have the same orientation. This also applies to the second guide blades 15 of the second guide blade group 22. The three left-hand guide blades 15 have a different orientation in relation to the axial direction 18 than the two right-hand guide blades 15 in this case as well.

Furthermore, it can be seen especially in FIGS. 11 and 12 that at least one guide blade 14, 15 each, which has a greater blade length than the other guide blades 14, 15 within the same guide blade group 21, 22, is present within the respective guide blade group 21, 22. The longer guide blades are designated by 14' and 15' in FIGS. 11 and 12. As can be recognized, each guide blade group 21, 22 contains three guide blades 14', 15' that are longer than the other guide blades 14, 15. These longer guide blades 14', 15' can also be recognized in FIG. 8. However, the first guide blades 14 and the second guide blades 15 are advantageously essentially of an identical design. In particular, the shorter first guide blades 14 correspond to the shorter second guide blades 15, while the longer first guide blades 14' correspond to the longer second guide blades 15'.

Further, provisions are made for the first guide blade group 21 and the second guide blade group 22 to contain the same number of guide blades 14, 15. Each guide blade group 21, 22 contains five guide blades 14, 15 each in the examples shown. It is clear that other numbers are possible, in principle, as well. Further, only two guide blade groups 21, 22 are formed here. The two guide blade groups 21, 22 extend in the circumferential direction 17 essentially by the same amount, i.e., over 180° each, so that each guide blade group 21, 22 covers about half the circumference of the section 13 each. It is clear here as well that other divisions and other numbers of guide blade groups are also possible.

All guide blades 14, 15 end self-supporting radially inside, i.e., in the area of their blade tips 31. Further, the guide blades 14, 15 extend each such that they do not touch each other. According to FIG. 8, all guide blades 14, 15 end in front of the central longitudinal axis 24. By contrast, at least one of the guide blades 14, 15 may be made so long in another embodiment that it extends beyond the central longitudinal axis 24 and also covers as a result the core areas containing the central longitudinal axis 24, which area is centrally open in FIG. 8.

Figure 1:
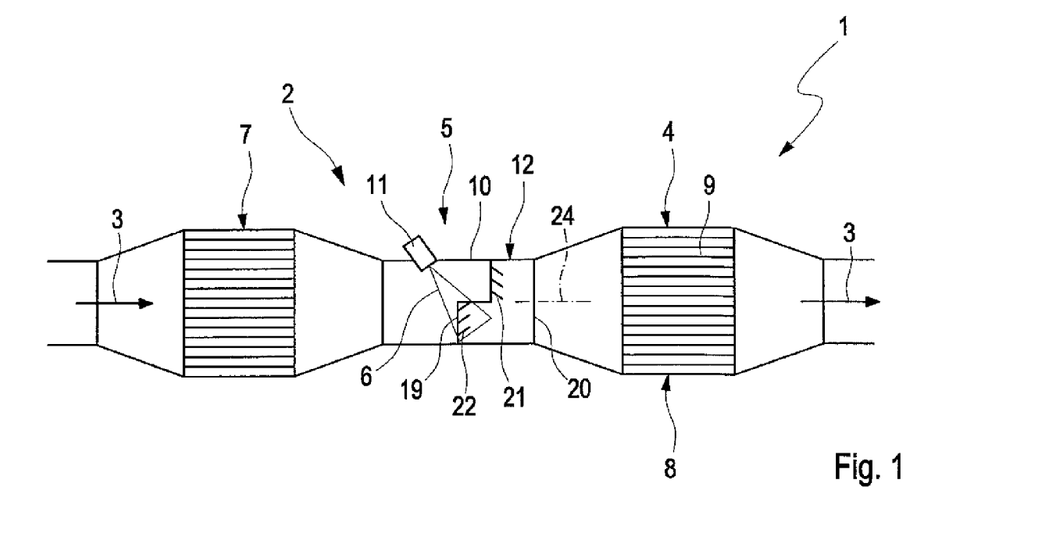
FIG. 1 is a highly simplified, circuit diagram-like schematic diagram of an exhaust system with a reactant injection device, which has a mixer.
Figure 2:
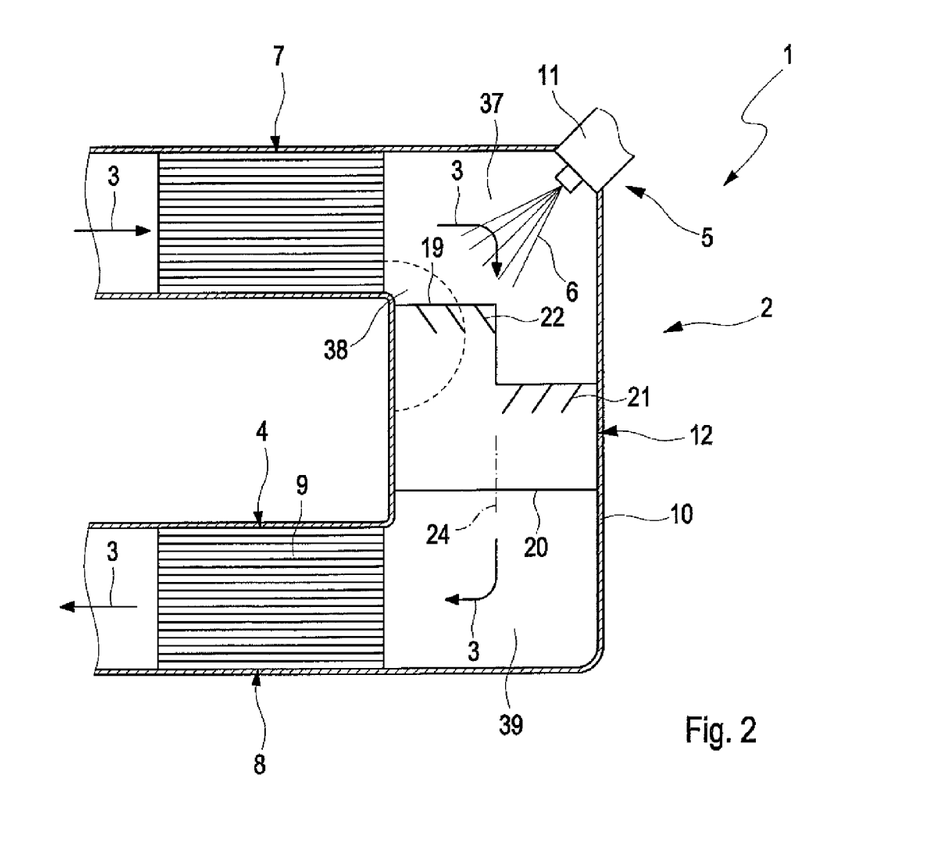
FIG. 2 is a schematic view of an exhaust system as shown in FIG. 1, but in another embodiment.

The guide blade groups 21, 22, which are axially offset in relation to one another, are arranged in the preferred embodiment shown in FIGS. 8 through 11 on the incoming flow side of the mixer 12 only, which side correspond to the first axial side 19 and will hereinafter also be designated by 19. This preferred embodiment is also indicated in FIGS. 1 and 2. The two guide blade groups 21, 22 are shown there on the incoming flow side 19 in a simplified manner. The guide blades 14, 15 are provided exclusively on the incoming flow side 19 there as well.

Figure 3:
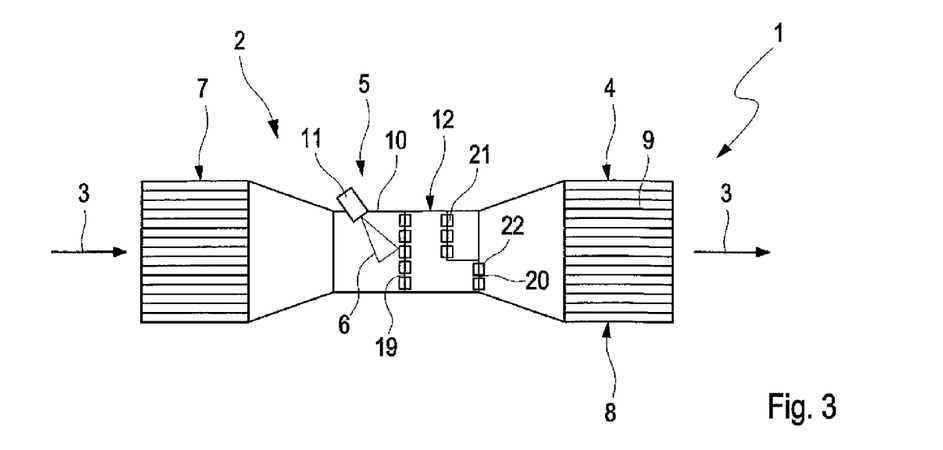
FIG. 3 is a schematic view of an exhaust system as shown in FIG. 1, but in another embodiment of the mixer.

FIGS. 3 through 7 show, purely as examples, further embodiments for the mixer 12, which are characterized especially in that guide blades are also arranged on the discharge side. The discharge side corresponds to the second axial side 20 and can hereinafter likewise be designated by 20. Further, FIG. 3 shows an embodiment, in which the guide blades 14, 15 are arranged in a stepped manner and divided into guide blade groups 21, 22 on the discharge side 20. Contrary to this, the guide blades on the incoming flow side 19 are arranged in a common axial section of the pipe section 13.

Figure 4:
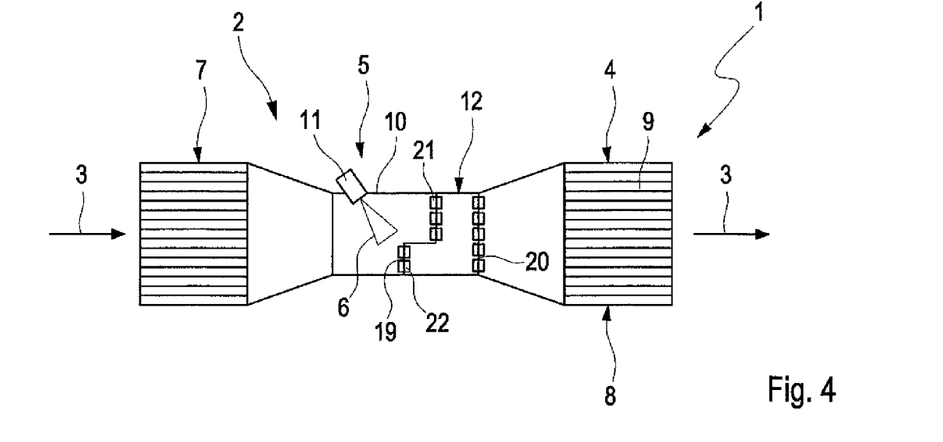
FIG. 4 is a schematic view of an exhaust system as shown in FIG. 3, but in another embodiment of the mixer.

The mixer 12 from FIG. 3 with reversed axial sides 19, 20 is installed in the embodiment shown in FIG. 4, so that the stepped arrangement of the guide blades can again be found on the incoming flow side 19, while the guide blades on the discharge side 20 are arranged in a common axial section of the pipe section 13.

Figure 5:
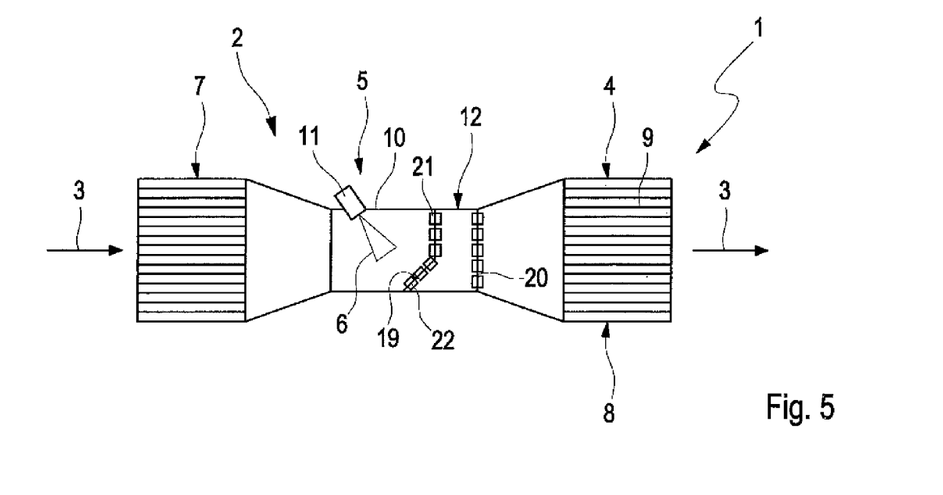
FIG. 5 is a schematic view of an exhaust system as shown in FIG. 3, but in another embodiment of the mixer.

In addition, the guide blades 15 of the second guide blade group 22 offset towards the incoming flow side 19 are arranged axially offset in relation to one another within the second guide blade group 22 in FIG. 5, as a result of which a multistep transition is created within the second guide blade group 22 to the guide blades 14 of the first guide blade group 21 which is arranged offset towards the discharge side.

Figure 6:
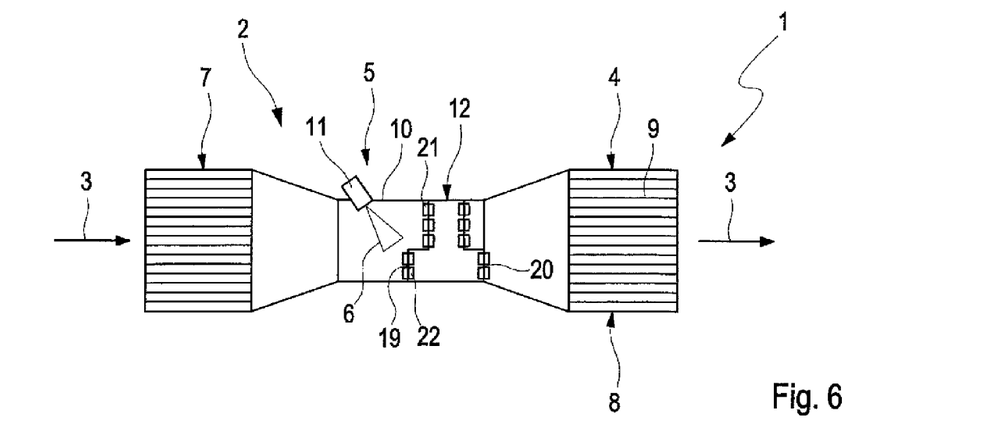
FIG. 6 is a schematic view of an exhaust system as shown in FIG. 3, but in another embodiment of the mixer.
Figure 7:
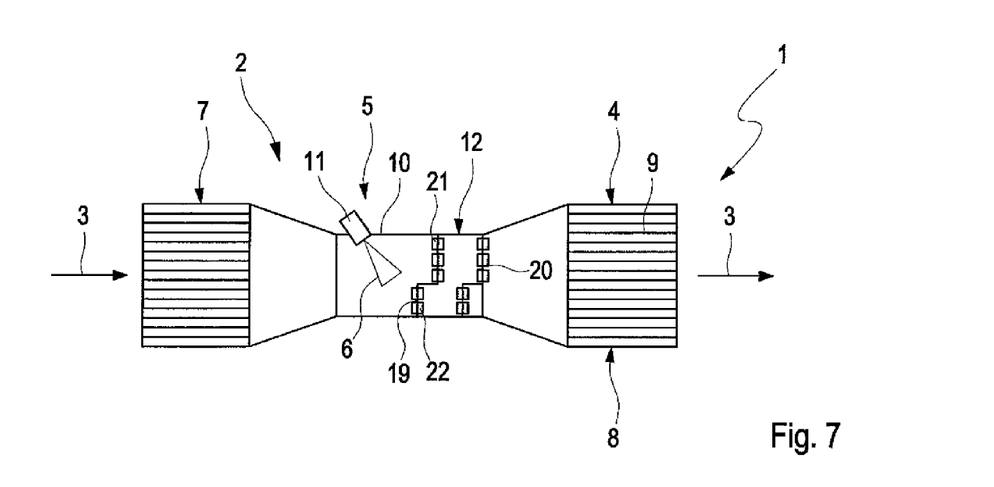
FIG. 7 is a schematic view of an exhaust system as shown in FIG. 3, but in another embodiment of the mixer.
Figure 8:
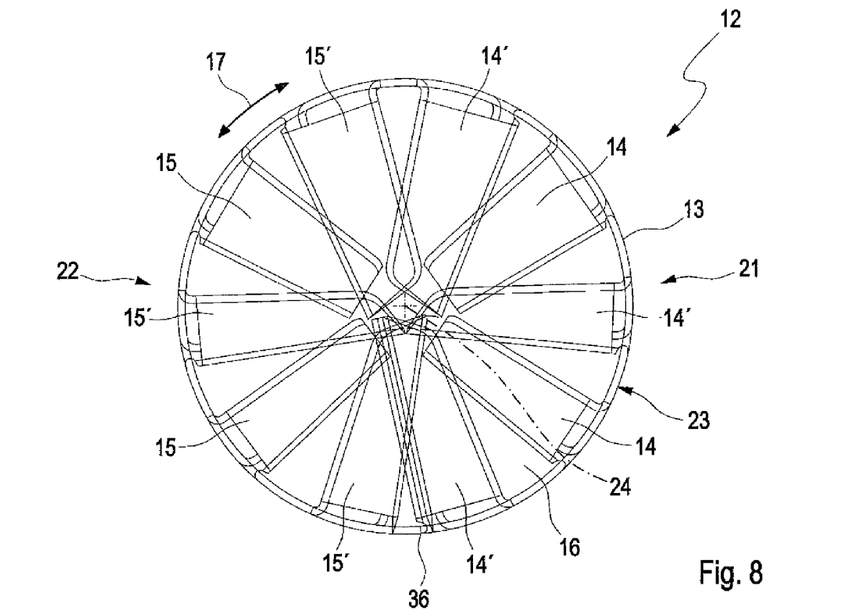
FIG. 8 is an axial view of the mixer with the guide blades shown as transparent guide blades.

Two guide blade groups with guide blades offset axially in relation to one another are located on both the incoming flow side 19 and the discharge side 20 in the embodiment shown in FIG. 6. Two guide blade groups, which are axially offset in relation to one another, can be recognized on the incoming flow side and on the discharge side in the embodiment shown in FIG. 7 as well. The offset of the two guide blade groups on the incoming flow side 19 is opposite that on the discharge side 20 in the embodiment shown in FIG. 6. Contrary to this, the offset of the two guide blade groups is in the same direction on the incoming flow side 19 and on the discharge side 20 in the embodiment shown in FIG. 7.

According to the embodiments shown in FIGS. 1 through 7, the injector 11 is arranged laterally on the pipe arrangement 10. Further, the above-described mixer 12 is arranged in the pipe arrangement 10 in the embodiments according to FIGS. 1, 2 and 4 through 7 such that the two guide blade groups 21, 22 are located each on the incoming flow side 19 of the mixer 12. Further, the mixer 12 is arranged in terms of its rotation position such that the first guide blade group 21 faces the injector 11, while the second guide blade group 22 faces away from the injector 11. The first guide blade group 21 is correspondingly located in a cross-sectional area that is a proximal area in relation to the injector 11, while the second guide blade group 22 is arranged in a cross-sectional area that is a distal area in relation to the injector 11. Furthermore, the first guide blade group 21 is arranged axially offset in the direction of the discharge side 20 of the mixer 12 in relation to the second guide blade group 22.

In addition, the injector 11 is arranged or designed in the embodiments being shown here such that the spray jet 6 that can be generated with it is sloped in relation to the axial direction 18 of the mixer 12. For example, the spray jet 6 may be sloped by about 45° in relation to the axial direction 18 of the mixer 12.

In the special embodiment shown in FIG. 2, the pipe arrangement 10 has, upstream of the mixer 12, an arc 37, which generates a lateral or near-wall wake 38 in the exhaust gas flow 3, which [wake] is located opposite the injector 11. The mixer 12 is positioned in the pipe arrangement 10 such that the second guide blade group 22 protrudes axially into this wake 38.

In addition, it is remarkable in the embodiment shown in FIG. 2 that the above-mentioned arc 37 describes an arc angle of about 90°. The exhaust gas flow 3 is thus deflected by 90°. The oxidation catalytic converter 7 is arranged here directly upstream of the arc 37. Another arc 39, which brings about a further flow deflection, preferably likewise by about 90°, is formed in the pipe arrangement 10 in the example shown in FIG. 2. The first arc 37 and this second arc 39 are preferably located in the same plane, so that the exhaust gas flow is deflected by a total of 180°. The SCR catalytic converter 4 or the particle filter 8 provided with the SCR catalytic converter coating 9 adjoins directly the second arc 39. This results in an especially compact form of construction of the reactant feeding device 5.

While specific embodiments of the invention have been shown and described in detail to illustrate the application of the principles of the invention, it will be understood that the invention may be embodied otherwise without departing from such principles.

What is claimed is:

1. A mixer for an exhaust system of an internal combustion engine for mixing a reactant with an exhaust gas flow, the mixer comprising:
   a pipe section, which borders a flow cross section through which the exhaust gas flow can flow in a circumferential direction, extending in an axial direction from a first axial side of the pipe section to a second axial side of the pipe section;
   a plurality of guide blades, which project from the pipe section at least on one of the axial sides such that the plurality of guide blades protrude into the flow cross section, wherein:
   the plurality of guide blades are divided into at least a first guide blade group and a second guide blade group, which are arranged offset in the circumferential direction;
   the guide blades of the first guide blade group are arranged axially offset in relation to the guide blades of the second guide blade group; and
   the first guide blade group and the second guide blade group follow each other in the circumferential direction, each of the first guide blade group and the second guide blade group extending only over a part of a circumference of the pipe section such that the first guide blade group and the second guide blade group do not overlap each other in the axial direction.

2. A mixer in accordance with claim 1, wherein the plurality of guide blades that are divided into at least the first guide blade group and the second guide blade group are on one of the axial sides and are axially offset in relation to one another.

3. A mixer in accordance with claim 1, wherein:
   the guide blades of the first guide blade group are arranged on one axial side; and
   the guide blades of the second guide blade group are arranged on another axial side.

4. A mixer in accordance with claim 1, wherein the guide blades of the first guide blade group have different pitch angles than the guide blades of the second guide blade group.

5. A mixer in accordance with claim 1, wherein the pitch angles of the guide blades of the first guide blade group have a pitch angle orientation direction opposite a pitch angle of the guide blades of the second guide blade group.

6. A mixer in accordance with claim 1, wherein the pipe section and the guide blades are formed by a single shaped sheet metal part.

7. A mixer in accordance with claim 1, wherein at least one of the guide blades within at least one of the guide blade groups has a different pitch angle in relation to the axial direction than at least one other of the guide blades.

8. A mixer in accordance with claim 1, wherein at least one of the guide blades of one guide blade group has a different blade length than at least one of the guide blades of the other guide blade group, wherein the blade length is measured from a blade foot arranged at the pipe section to a blade tip located at a distance from the pipe section.

9. A mixer in accordance with claim 8, wherein at least one of the longer guide blades extends beyond a central longitudinal axis.

10. A mixer in accordance with claim 1, wherein at least one of the guide blades at least within one of the guide blade groups has a different blade length than at least one other of the guide blades, wherein the blade length is measured from a blade foot arranged at the pipe section to a blade tip located at a distance from the pipe section.

11. A mixer in accordance with claim 9, wherein at least one of the longer guide blades extends beyond a central longitudinal axis.

12. A mixer in accordance with claim 1, wherein the first guide blade group and the second guide blade group extend in the circumferential direction over an angle range between and including 30° to and including 330° each or over about half the circumference of the pipe section each.

13. A mixer in accordance with claim 1, wherein at least one of:
the first guide blade group and the second guide blade group each contain an equal number or different numbers of guide blades;
the guide blades of the first guide blade group have a different blade width than the guide blades of the second guide blade group; and
all of the guide blades are arranged in a contactless manner relative to each other.

14. A reactant feeding device for an exhaust system of an internal combustion engine, the reactant feeding device comprising:
a pipe arrangement for guiding an exhaust gas flow;
an injector arranged at the pipe arrangement for generating a spray jet from reactant for introduction of the reactant into the exhaust gas flow; and
a mixer arranged in the pipe arrangement downstream of the injector in relation of the exhaust gas flow, the mixer comprising:
a pipe section, which borders a flow cross section through which the exhaust gas flow can flow in a circumferential direction, extending in an axial direction from a first axial side of the pipe section to a second axial side of the pipe section;
a plurality of guide blades, which project from the pipe section at least on one of the axial sides such that the plurality of guide blades protrude into the flow cross section, wherein:
the plurality of guide blades are divided into at least a first guide blade group and a second guide blade group, which are arranged offset in the circumferential direction;
the guide blades of the first guide blade group are arranged axially offset in relation to the guide blades of the second guide blade group; and
the first guide blade group and the second guide blade group follow each other in the circumferential direction, each of the first guide blade group and the second guide blade group extending only over a part of a circumference of the pipe section such that the first guide blade group and the second guide blade group do not overlap each other in the axial direction.

15. A device in accordance with claim 14, wherein:
the injector is arranged laterally at the pipe arrangement;
the mixer is arranged such that the first guide blade group and the second guide blade group are located on an incoming flow side of the mixer and the first guide blade group faces the injector and the second guide blade group faces away from the injector; and
the guide blades of the first guide blade group are arranged axially offset in the direction of a discharge side of the mixer in relation to the guide blades of the second guide blade group.

16. A device in accordance with claim 15, wherein:
upstream of the mixer, in relation to the exhaust gas flow, the pipe arrangement has an arc, which generates a wake in the exhaust gas flow; and
the mixer is arranged such that the first guide blade group and the second guide blade group are located on an incoming flow side of the mixer and the guide blades of the second guide blade group axially protrude into the wake.

17. A device in accordance with claim 14, wherein:
upstream of the mixer, in relation to the exhaust gas flow, the pipe arrangement has an arc, which generates a wake in the exhaust gas flow; and
the mixer is arranged such that the first guide blade group and the second guide blade group are located on an incoming flow side of the mixer and the guide blades of the second guide blade group axially protrude into the wake.

18. An exhaust system for an internal combustion engine, the exhaust system comprising:
an SCR catalytic converter; and
a reactant feeding device arranged upstream of the SCR catalytic converter, the reactant feeding device comprising:
a pipe arrangement for guiding an exhaust gas flow;
an injector arranged at the pipe arrangement for generating a spray jet from reactant for introduction of the reactant into the exhaust gas flow; and
a mixer arranged in the pipe arrangement downstream of the injector in relation of the exhaust gas flow, the mixer comprising:
a pipe section, which borders a flow cross section through which the exhaust gas flow can flow in a circumferential direction, extending in an axial direction from a first axial side of the pipe section to a second axial side of the pipe section;
a plurality of guide blades, which project from the pipe section at least on one of the axial sides such that the plurality of guide blades protrude into the flow cross section, wherein:
the plurality of guide blades are divided into at least a first guide blade group and a second guide blade group, which are arranged offset in the circumferential direction;
the guide blades of the first guide blade group are arranged axially offset in relation to the guide blades of the second guide blade group; and
the first guide blade group and the second guide blade group follow each other in the circumferential direction, each of the first guide blade group and the second guide blade group extending only over a part of a circumference of the pipe section such that the first guide blade group and the second guide blade group do not overlap each other in the axial direction.

19. A system in accordance with claim 18, wherein:
the injector is arranged laterally at the pipe arrangement;
the mixer is arranged such that the first guide blade group and the second guide blade group are located on an incoming flow side of the mixer and the first guide blade group faces the injector and the second guide blade group faces away from the injector; and the guide blades of the first guide blade group are arranged axially offset in the direction of a discharge side of the mixer in relation to the guide blades of the second guide blade group.

20. A system in accordance with claim 18, wherein:

upstream of the mixer, in relation to the exhaust gas flow, the pipe arrangement has an arc, which generates a wake in the exhaust gas flow; and the mixer is arranged such that the first guide blade group and the second guide blade group are located on an incoming flow side of the mixer and the guide blades of the second guide blade group axially protrude into the wake.

\* \* \* \* \*